(12) United States Patent
Horie

(10) Patent No.: US 8,773,249 B2
(45) Date of Patent: Jul. 8, 2014

(54) CAR ALARM APPARATUS

(75) Inventor: Hidetoshi Horie, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 13/265,398

(22) PCT Filed: Jan. 5, 2010

(86) PCT No.: PCT/JP2010/000022
§ 371 (c)(1),
(2), (4) Date: Oct. 20, 2011

(87) PCT Pub. No.: WO2010/122693
PCT Pub. Date: Oct. 28, 2010

(65) Prior Publication Data
US 2012/0038472 A1    Feb. 16, 2012

(30) Foreign Application Priority Data
Apr. 22, 2009    (JP) .................... 2009-104433

(51) Int. Cl.
*B60Q 1/00*    (2006.01)
(52) U.S. Cl.
USPC ............... 340/425.5; 340/426.1; 340/426.13; 340/426.23
(58) Field of Classification Search
None
See application file for complete search history.

(56) References Cited

U.S. PATENT DOCUMENTS

| | | | |
|---|---|---|---|
| 3,422,398 A | | 1/1969 | Rubin |
| 4,220,947 A | * | 9/1980 | Yamamoto .................... 340/430 |
| 4,262,277 A | * | 4/1981 | Abonia .......................... 340/471 |
| 4,528,563 A | * | 7/1985 | Takeuchi ...................... 340/903 |
| 5,469,134 A | * | 11/1995 | Garrett et al. ............. 340/426.11 |
| 5,568,129 A | * | 10/1996 | Sisselman et al. ............ 340/628 |
| 2007/0296560 A1 | | 12/2007 | Chen |

FOREIGN PATENT DOCUMENTS

| | | |
|---|---|---|
| CN | 2541272 Y | 3/2003 |
| CN | 101108609 A | 1/2008 |
| GB | 849203 | 9/1960 |
| JP | 4-31059 | 3/1992 |
| JP | 2001-71870 | 3/2001 |
| JP | 2008-105527 | 5/2008 |

OTHER PUBLICATIONS

Chinese Office Action dated Jun. 5, 2013, Application No. 201080017647.5, 13 pages.

* cited by examiner

*Primary Examiner* — Curtis King
*Assistant Examiner* — Benjamin C. Lee
(74) *Attorney, Agent, or Firm* — Rankin, Hill & Clark LLP

(57) ABSTRACT

A car alarm apparatus includes a first horn; a second horn; an electrical source; a theft detection section; a horn switch; a first relay closed when the horn switch is operated; a first fuse connected to the electrical source in series with the first relay and the first horn; a second fuse connected to the electrical source separately from the first fuse; and a second relay connected to the electrical source in series with the second fuse and the second horn, wherein the second relay includes a first contact that connects the second horn to an electrical source through the first fuse and the first relay in parallel with the first horn and a second contact that connects the second horn to the electrical source through the second fuse, and closes the second contact when the occurrence of the theft is detected.

2 Claims, 6 Drawing Sheets

CAR ALARM APPARATUS

TECHNICAL FIELD

The present invention relates to a car alarm apparatus that gives an alarm at the time of ordinary use of a car and at the time of a theft.

Priority is claimed on Japanese Patent Application No. 2009-104433, filed on Apr. 22, 2009, the contents of which are incorporated herein by reference.

BACKGROUND ART

In recent years, cars and the like have been equipped with a car alarm apparatus having a function of sounding an alarm to the surroundings when the possibility of the car being stolen is detected, in addition to a function of sounding a horn (alarm) in the case of providing a warning to peripheral cars or pedestrians at the time of the ordinary use of cars which are moving or the like.

As disclosed in the following Patent Document 1, in this type of car alarm apparatus, it is important that an alarm reliably operates at the time of a theft. FIG. 6 shows a configuration illustrating an electrical circuit in a conventional car alarm apparatus.

This conventional car alarm apparatus has two ordinary horns 81a and 81b, and one exclusive horn 82 operating at the time of a theft. The ordinary horns 81a and 81b are connected to one terminal of a switch 131a included in a first relay circuit 131. The other terminal of the switch 131a is connected to a positive terminal of an electrical source 110 through a first fuse 121. In addition, one terminal of a coil 131b included in the first relay circuit 131 is connected to a first fuse 121 similarly to the switch 131a. The other terminal of the coil 131b is connected to one terminal of a diode 150 and a horn switch 160.

On the other hand, the exclusive horn 82 operating at the time of a theft is connected to one terminal of a switch 132a included in a second relay circuit 132. The other terminal of the switch 132a is connected to a positive terminal of the electrical source 110 through a second fuse 122. In addition, one terminal of a coil 132b included in the second relay circuit 132 is connected to the second fuse 122 similarly to the switch 132a. The other terminal of the coil 132b is connected to one terminal of the diode 150 and a security control unit 170. Meanwhile, as shown in FIG. 6, a system constituted by the first fuse 121, the first relay circuit 131 and the ordinary horns 81a and 81b, and a system constituted by the second fuse 122, the second relay circuit 132 and the exclusive horn 82 operating at the time of a theft are formed in parallel to (separately from) the electrical source 110.

Here, the diode 150 provided between the first relay circuit 131 and the second relay circuit 132 has a connection configuration in which the direction thereof is set so that a current flows from the first relay circuit 131 to the security control unit 170. Thereby, when the electrical conduction is made by an operation of the horn switch 160 (that is, at the time of ordinary use), a current flows to the electrical source 110 through the first fuse 121 and the coil 131b of the first relay circuit 131 to the horn switch 160. A current flows to the coil 131b, whereby the switch 131a of the first relay circuit 131 is closed, and thus a current flows to the ordinary horns 81a and 81b. As a result, the ordinary horns 81a and 81b operate, and an alarm sound is given as an alarm.

In addition, when a theft is detected by a sensor (not shown) or the like, the security control unit 170 is controlled so that the electrical potential of the input end thereof (B point in FIG. 6) becomes equal to the ground potential. Then, a current flows from the electrical source 110 through the first fuse 121, the coil 131b of the first relay circuit 131 and the diode 150 to the security control unit 170, and flows from the electrical source 110 through the second fuse 122 and the coil 132b of the second relay circuit 132 to the security control unit 170. Thereby, the switch 131a of the first relay circuit 131 and the switch 132a of the second relay circuit 132 are simultaneously closed, all the horns of the ordinary horns 81a and 81b and the exclusive horn 82 operate at the time of a theft, and an alarm regarding the theft is issued.

Incidentally, it is often the case that the ordinary horns 81a and 81b are disposed at the front end portion of a car in order to satisfy a sound pressure as an alarm stipulated by law. When a person committing a theft performs machining from the outside of the car on the ordinary horn disposed on this area and grounds an A point in FIG. 6, an excessive current flows in a path that connects the electrical source 110, the first fuse 121, the switch 131a and the A point by the electrical conduction of the switch 131a of the first relay circuit 131 through the control of the security control unit 170, and thus the first fuse 121 is blown. As a result, the ordinary horns 81a and 81b become inoperable. However, when the exclusive horn 82 operating at the time of a theft is disposed at a location that is out of reach from the outside, for example, the engine compartment, the ordinary horn and the exclusive horn operating at the time of a theft become separate from each other. For this reason, even when the above-mentioned A point is grounded, the second fuse 122 is not blown, and the exclusive horn 82 operating at the time of a theft can continue to sound an alarm.

PATENT DOCUMENT

[Patent Document 1] Japanese Utility Model Application, First Publication No. 4-31059

DISCLOSURE OF THE INVENTION

Problem that the Invention is to Solve

However, in the above-mentioned conventional car alarm apparatus, since it is necessary to provide an exclusive horn operating at the time of a theft separately from an ordinary horn used in normal operation, there is a problem in that the number of required horns becomes larger and thus costs increase, and further a space for installing the exclusive horn operating at the time of a theft also has to be secured.

The present invention is contrived in view of such circumstances, and an object thereof is to provide a low-cost and space-saving car alarm apparatus capable of reliably issuing an alarm at the time of a theft.

Means for Solving the Problem

The present invention adopts the followings in order to solve the above-mentioned problem and achieve such an object. That is:

(1) A car alarm apparatus of the present invention includes: a first horn provided in a car; a second horn provided in a place inaccessible from an outside of the car; an electrical source that supplies power to the first horn and the second horn; a theft detection section that detects an occurrence of a theft of the car; a horn switch that receives an operation of an operator; a first relay closed when the horn switch is operated; a first fuse connected to the electrical source in series with the first relay and the first horn; a second fuse connected to the electrical source separately from the first fuse; and a second relay connected to the electrical source in series with the second fuse and the second horn, wherein the second relay includes a first contact that connects the second horn to an electrical source through the first fuse and the first relay in parallel with the first horn and a second contact that connects the second horn to the electrical source through the second fuse, and closes the second contact when the occurrence of the theft is detected.

According to the car alarm apparatus of the above (1), at the time of the operation of the horn switch, the electrical conduction is made from the electrical source through the first fuse and the first relay to the first horn, and the electrical conduction is made from the electrical source through the first fuse and the first contact of the second relay to the second horn. On the other hand, when the occurrence of the theft is detected, the electrical conduction is made from the electrical source through the second fuse and the second contact of the second relay to the second horn. Consequently, at the time of the operation of the normal horn switch, it is possible to sound both the first horn and the second horn. In addition, when the occurrence of the theft is detected even in the case in which the first fuse is blown by the theft or the like, it is possible to reliably sound the second horn through the second fuse. For this reason, it is possible to realize a reduction in cost by preventing the number of parts from increasing and to achieve an improvement in security.

(2) In the car alarm apparatus of the above (1), at least one of the first fuse and the second fuse may double as a fuse provided between a lighting appliance mounted in the car and the electrical source.

According to the car alarm apparatus of the above (2), when the first fuse or the second fuse is blown, a predetermined lighting appliance mounted in the car is not turned on, and thus it is possible to easily perceive fuse blowing. Therefore, it is possible to reliably sound the first horn and the second horn at the time of the operation of the horn switch by resolving the fuse blowing state, and to reliably sound the second horn when the occurrence of the theft is detected.

Effects of the Invention

According to the car alarm apparatus of the present invention, it is possible to achieve a reduction in cost and space and to reliably sound an alarm at the time of a theft.

DESCRIPTION OF EMBODIMENTS

A car alarm apparatus according to an embodiment of the present invention will be described below with reference to the drawings.

Figure 1:
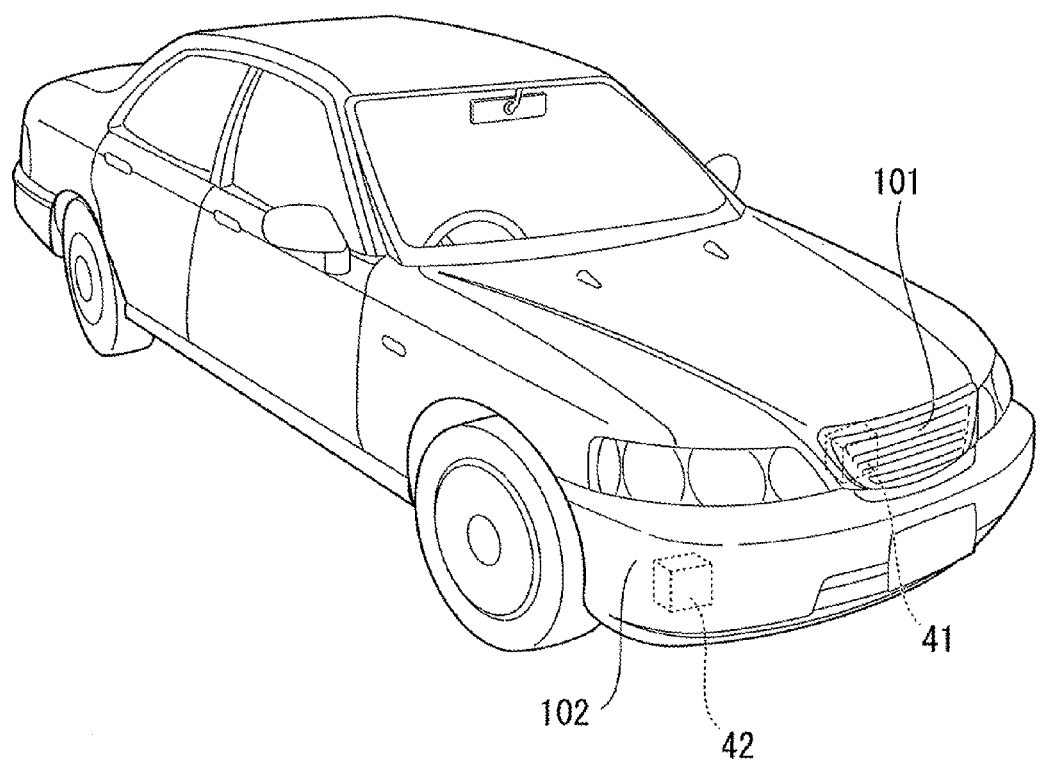
FIG. 1 is a perspective view illustrating installation positions of a low-pitched horn and a security horn of a car alarm apparatus according to an embodiment of the present invention.
Figure 2:
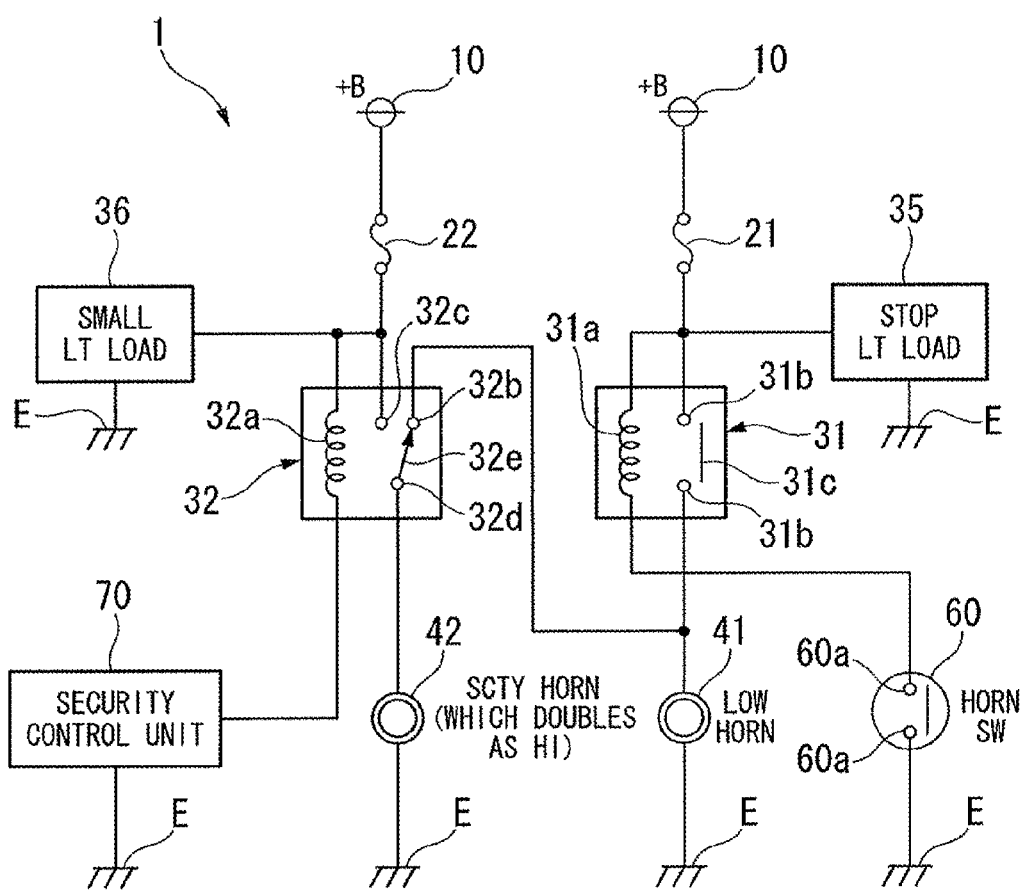
FIG. 2 is an electrical circuit diagram illustrating the car alarm apparatus according to the embodiment.

A car alarm apparatus 1 according to an embodiment of the present invention is an apparatus that drives an antitheft alarm in addition to a horn, and includes a low-pitched horn (LOW HORN, first horn) 41 giving a relatively low-pitched and a security horn (SCTY HORN, or second horn) 42 giving a relatively high-pitched, as shown in FIGS. 1 and 2. The low-pitched horn 41 is disposed in the vicinity and the like of a grill opening 101 of the car front end portion in order to satisfy the sound pressure as a horn stipulated by the laws in force. In addition, the security horn 42 is disposed in a position incapable of being easily contacted from the outside of the car, particularly the inside and the like of a bumper 102 of the car front side. The security horn 42 gives an alarm sound at the time of the detection of a theft, and is sounded together with the low-pitched horn 41, as a high-pitched horn which takes charge of a high-pitched range at the time of the operation of the horn.

Figure 3:
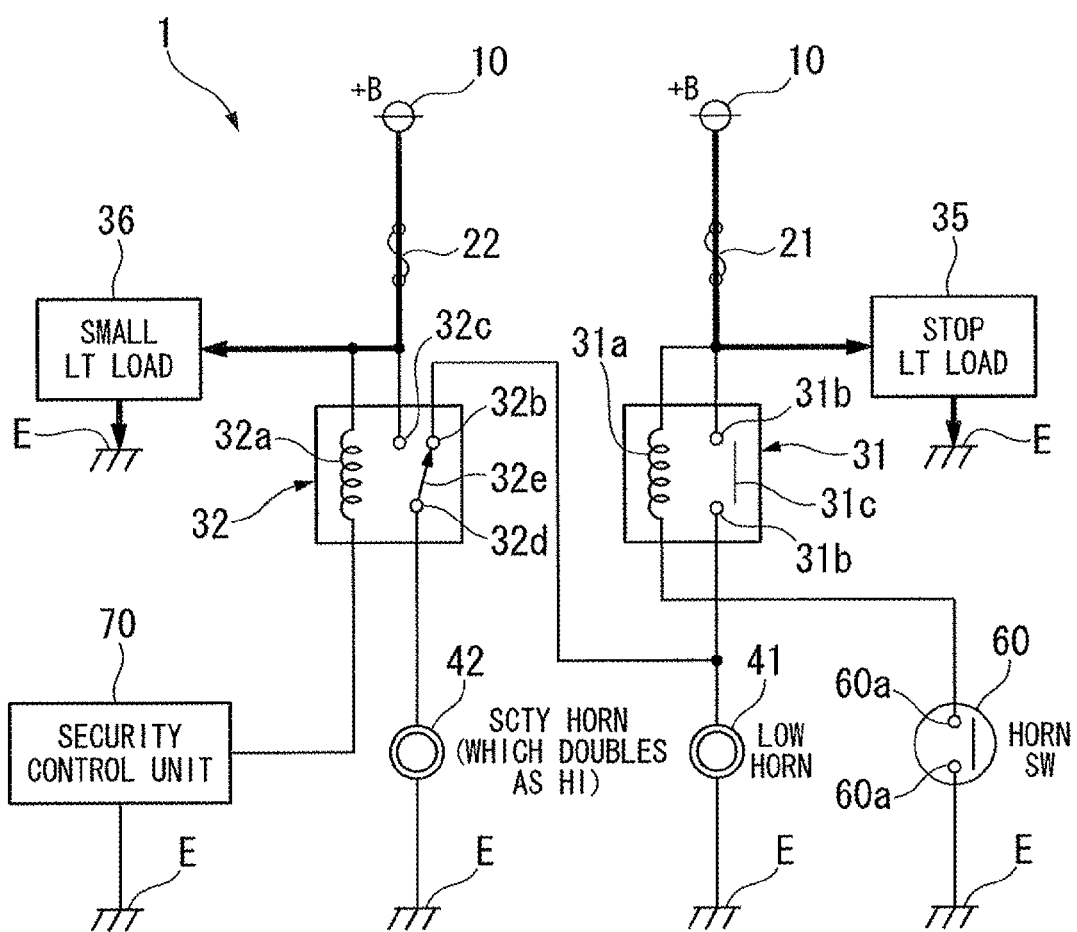
FIG. 3 is an electrical circuit diagram schematically illustrating a current flowing to a brake light load and a small light load according to the embodiment.

As shown in FIG. 2, one end side of the low-pitched horn 41 is connected to an electrical source (+B) 10 through a first relay circuit 31 and a first fuse 21, and the other end side of the low-pitched horn 41 is connected to an earth E of a car body and the like. The first relay circuit 31 includes a coil 31*a*, a contact 31*b* constituting a contact closed by the electrical conduction to the coil 31*a*, and a movable contact piece 31*c*. One end of the low-pitched horn 41 is connected to a ground-side terminal of the contact 31*b*, and the first fuse 21 is connected in series with an electrical source-side terminal of the contact 31*b*. In addition, an electrical source-side terminal of the coil 31*a* is connected to the electrical source-side terminal of the contact 31*b*, and the brake light load (stop LT load) 35 of the car is branched and connected thereto. Thereby, when a user stomps on a brake pedal, as shown in FIG. 3, the electrical conduction is made from an electrical source 10 through the first fuse 21 to the brake light load 35 and thus a brake light and the like are turned on.

In addition, a horn switch (HORN SW) 60 is interposed between the coil 31*a* and the earth E. The horn switch 60 is provided in a hub portion of a steering wheel (not shown) and the like. The horn switch 60 is pressed by a user, whereby a current flows to the coil 31*a* and thus the contacts 31*b* are closed therebetween.

On the other hand, the electrical source-side terminal which is one end side of a pair of terminals of the security horn 42 is connected to the electrical source 10 through a second relay circuit 32 and a second fuse 22. The ground-side terminal which is the other end side of a pair of terminals of the security horn 42 is connected to the earth E of the car body and the like.

The second relay circuit 32 includes a coil 32*a*, a first contact 32*b* constituting a c contact which switches two contacts by the electrical conduction to the coil 32*a*, a second contact 32*c*, a common contact 32*d* and a movable contact piece 32*e*. At the time of the electrical non-conduction to the coil 32*a*, the first contact 32*b* and the common contact 32*d* are closed therebetween by the movable contact piece 32*e*. On the other hand, at the electrical conduction to the coil 32*a*, the second contact 32*c* and the common contact 32*d* are closed therebetween by the movable contact piece 32*e*.

The second relay circuit 32 is configured such that the electrical source-side terminal of the low-pitched horn 41 mentioned above is connected to the first contact 32*b*, and the electrical source 10 is connected to the second contact 32*c* through the second fuse 22. In addition, the electrical source-side terminal of the security horn 42 is connected to the common contact 32d. Further, the electrical source-side terminal of the coil 32a is connected to the second contact 32c. In addition, a small light load (small LT load) 36 is branched and connected to the second contact 32c. Thereby, when the small light is turned on by a user, as shown in FIG. 3, the electrical conduction is made from the electrical source 10 through the second fuse 22 to the small light load 36 and thus the small light and the like are turned on.

In addition, a security control unit 70 that controls the electrical conduction to the coil 32a is connected between the coil 32a and the earth E. The switching control between the first contact 32b and the second contact 32c mentioned above is performed by the control of the electrical conduction to the coil 32a through the security control unit 70. Meanwhile, for the configuration mentioned above, four terminals are provided in the first relay circuit 31, and five terminals are provided in the second relay circuit 32.

The security control unit 70 determines the presence or absence of the occurrence of a theft based on an input from a sensor (not shown) that detects the theft of the car in which the car alarm apparatus 1 is installed. When it is determined that the theft occurs, control in which a sound is made and a sound alarm sound is output is performed by the electrical conduction to the security horn 42. A method of the electrical conduction to the security horn 42 includes, for example, a method of turning on a switching element or the like, and connecting the security horn 42 grounded previously to the electrical source 10, or the like. More specifically, when the occurrence of a theft is detected, the security horn is connected to the electrical source 10 through the second fuse 22 by switching from the first contact 32b of the second relay 32 to the second contact 32c thereof. The first contact 32b is configured to form a path in which the security horn 42 is connected to the electrical source 10 through the first fuse 21 by turning on the horn switch 60 in a normal state where the theft is not detected.

Here, as the sensor that detects the theft mentioned above, for example, a door lock sensor that detects a door lock state or a hood lock sensor that detects a hood state and the like may be used. In the case of the door lock sensor, an illegitimate release of the door lock by a third party can be determined based on the output thereof. In addition, in the case of the hood lock sensor, the opening of a hood which is not based on a regular procedure can be determined based on the output thereof.

For example, in the detection of the theft based on the door lock state, a state in which the door is locked from the outside of the car by the regular method is stored in a memory (not shown) of the security control unit 70. Thereafter, when the door lock sensor detects a state in which the door lock is released from the interior of the car at the time of maintenance of the locked state, the occurrence of theft is detected. In addition, similarly to the door lock state, also with respect to the detection of the theft based on the hood state, when the forcible opening of the hood or the release of the hood lock by an operation of a hood release lever provided within the car interior is detected, for example, in the state where the door of the car is locked, the occurrence of a theft is detected.

Meanwhile, the case in which the theft is detected based on the door lock sensor or the hood lock sensor as the security control unit 70 has been described. The contents of the theft and the detection method are not limited only to the contents mentioned above, but various actions in which there may be a concern that the theft of the car other than mentioned above is occurring may be detected to thereby sound the security horn 42.

Next, the operations of the car alarm apparatus 1 according to the embodiment, particularly each of the operations at the time of ordinary use and at the time of the theft will be described below.

Figure 4:
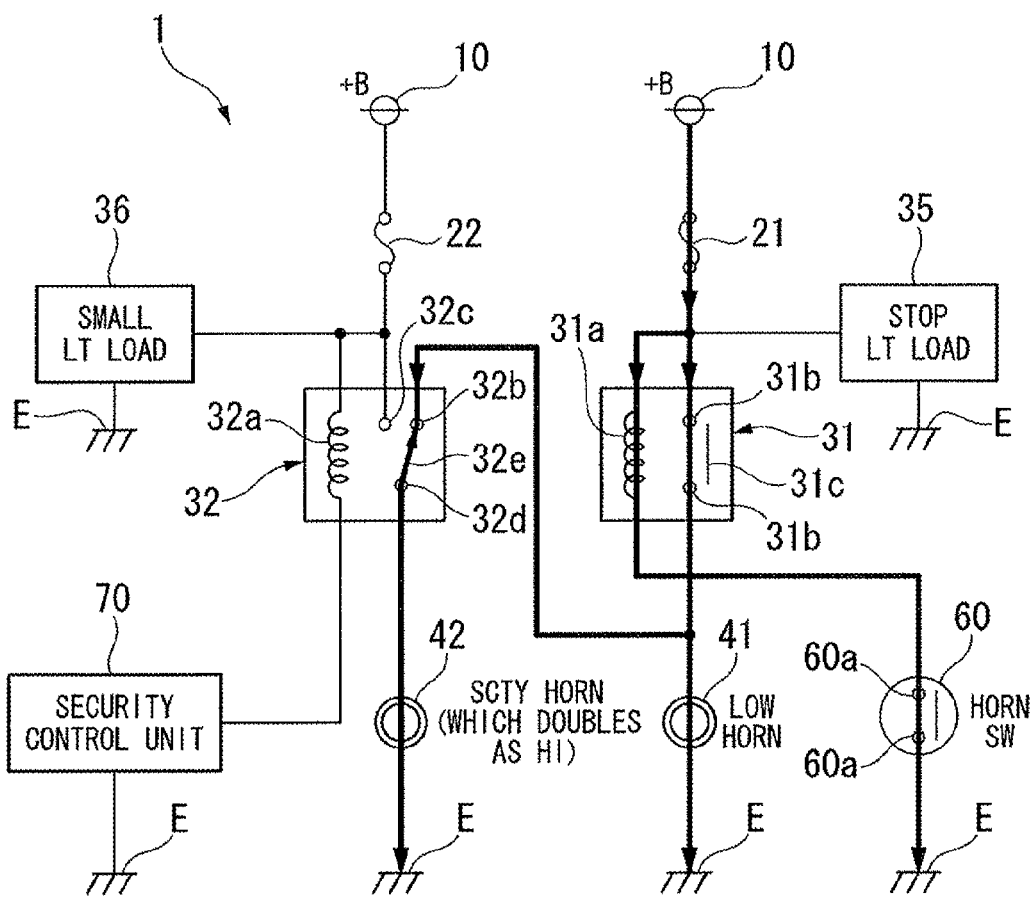
FIG. 4 is an electrical circuit diagram schematically illustrating a current flowing at the time of ordinary use according to the embodiment.

First, at the time of the ordinary use such as car moving, the first relay circuit 31 which is an a contact is in a state where the contacts 31b are opened therebetween, and the second relay circuit 32 which is a c contact is in a state where the first contact 32b and the common contact 32d are closed therebetween. Thereafter, when the horn switch 60 is pressed, as shown in FIG. 4, two contacts 60a of the horn switch 60 are short-circuited therebetween, and thus the electrical conduction is made from the electrical source 10 through the first fuse 21, the coil 31a of the first relay circuit 31, and the horn switch 60 to the earth E. At this time, since the electrical conduction to the coil 31a of the first relay circuit 31 is made, the contacts 31b of the first relay circuit 31 are closed therebetween by the movable contact piece 31c, and thus the electrical conduction is made from the electrical source 10 through the first fuse 21, the contacts 31b of the first relay circuit 31, and the low-pitched horn 41 to the earth E. Further, the electrical conduction is made from the electrical source 10 through the first fuse 21, the contacts 31b of the first relay circuit 31, and the first contact 32b of the second relay circuit 32, and the common contact 32d, and the security horn 42 to the earth E. That is, since the electrical conduction to the low-pitched horn 41 is made and the electrical conduction to the security horn 42 is made, the low-pitched horn 41 and the security horn 42 are simultaneously sounded, and thus a low-pitched sound of the low-pitched horn 41 and a high-pitched sound of the security horn 42 are simultaneously sounded as an alarm.

Figure 5:
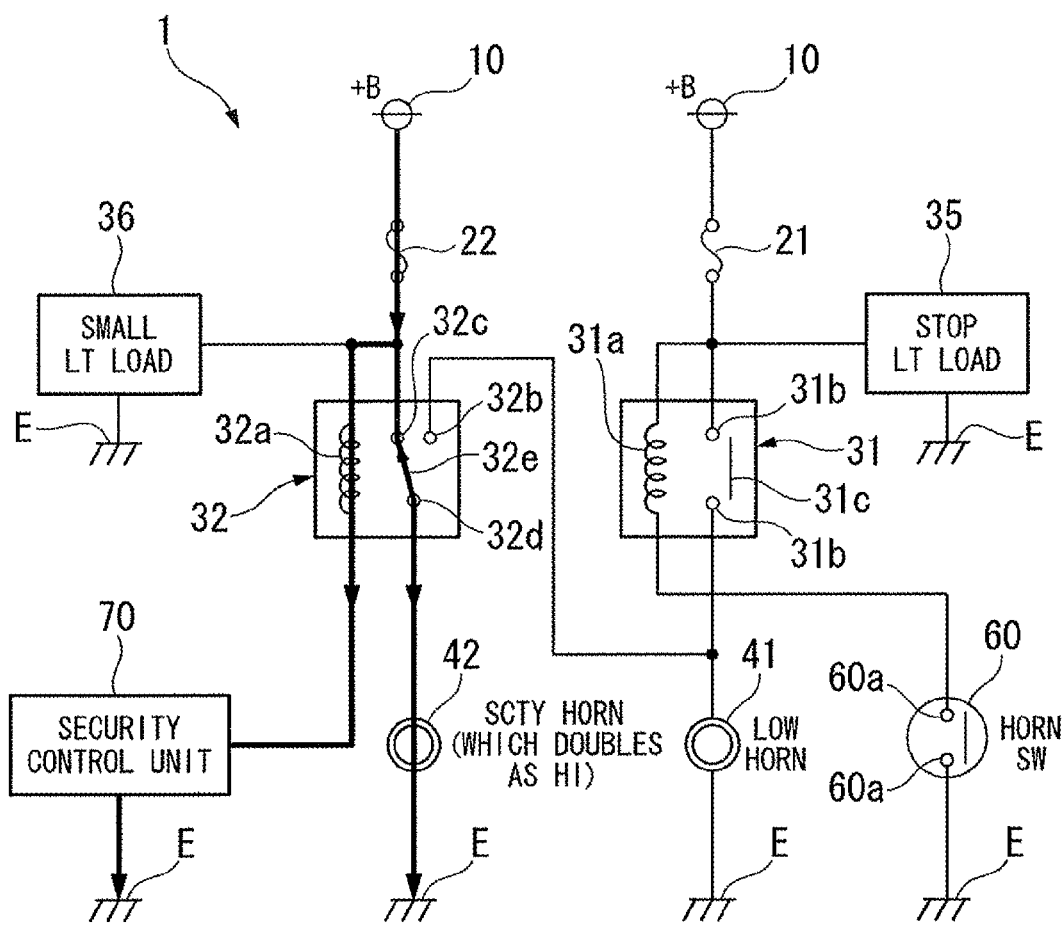
FIG. 5 is an electrical circuit diagram schematically illustrating a current flowing at the time of a theft according to the embodiment.
Figure 6:
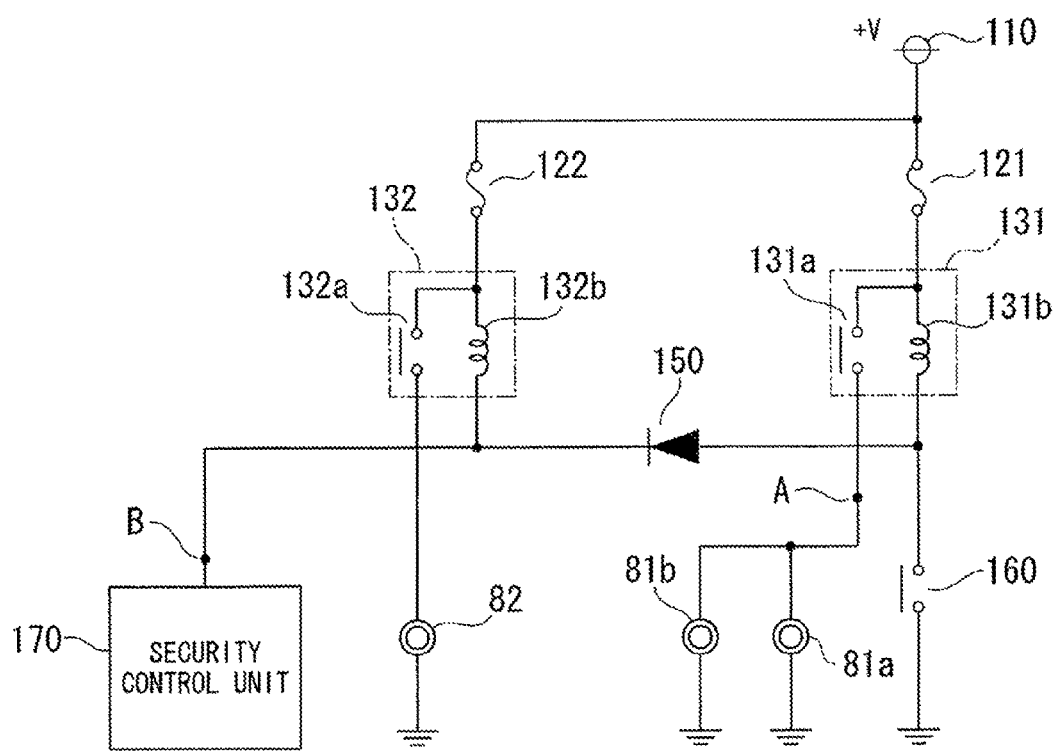
FIG. 6 is an electrical circuit diagram illustrating a conventional car alarm apparatus.

On the other hand, the security control unit 70 detects a theft in the case in which the door of the car is in a locked state, as shown in FIG. 5, the ground-side terminal of the coil 32a of the second relay circuit 32 is short-circuited to the earth E, and thus the electrical conduction is made from the electrical source 10 through the second fuse 22, the coil 32a of the second relay circuit 32, and the security control unit 70 to the earth E. Switching is performed from the state where the movable contact piece 32e of the second relay circuit 32 closes the first contact 32b—the common contact 32d to the state where it closes the second contact 32c—the common contact 32d, by the electrical conduction to the coil 32a of the second relay circuit 32 at this time. Thereby, the electrical conduction is made from the electrical source 10 through the second fuse 22, the second contact 32c of the second relay circuit 32, the common contact 32d thereof, and the security horn 42 to the earth E. The security horn 42 is sounded and the high-pitched alarm sound is issued by the electrical conduction to the security horn 42 at this time.

Here, when a large current exceeding the rating flows to the first fuse 21 due to the theft or the like, the first fuse 21 is blown and the electrical circuit is broken, the contacts 31b of the first relay circuit 31 are not closed even by the pressing of the horn switch 60 and thus the low-pitched horn 41 is not sounded.

However, when the theft is detected in the state where the electrical circuit to the low-pitched horn 41 is broken by the first fuse 21, the closed state of the movable contact piece 32e of the second relay circuit 32 is switched from the state of the first contact 32b —the common contact 32d to the state of the second contact 32c—the common contact 32d. Therefore, the electrical conduction to the security horn 42 inaccessible from the outside of the car is made and thus the alarm sound is issued.

The security horn 42 is inaccessible from the outside of the car, whereby the sounding of the security horn 42 is not stopped because a theft performed by bypassing the security horn 42 and melting down the second fuse 22 is not possible.

Therefore, according to the car alarm apparatus mentioned above, at the time of the operation of the horn switch 60, the electrical conduction is made from the electrical source 10 through the first fuse 21 and the first relay circuit 31 to the low-pitched horn 41, and the electrical conduction is made from the electrical source 10 through the first fuse 21 and the first contact 32*b* of the second relay circuit 32 to the security horn 42. On the other hand, when the occurrence of the theft is detected, the electrical conduction is made from the electrical source 10 through the second fuse 22 and the second contact 32*c* of the second relay circuit 32 to the security horn 42, and thus both the low-pitched horn 41 and the security horn 42 are sounded at the time of the operation of the normal horn switch 60. In addition, when the occurrence of the theft is detected even in the case in which the first fuse 21 is blown by the theft or the like, the security horn 42 is reliably sounded through the second fuse 22. Therefore, it is possible to realize the reduction in cost by preventing the number of parts from increasing, and to improve security.

In addition, since the stop light of the car is not turned on when the first fuse 21 is blown and the small light of the car is not turned on when the second fuse 22 is blown, it is possible to easily perceive the fuse blowing of the first fuse 21 and the second fuse 22. As a result, it is possible to reliably sound the low-pitched horn 41 and the security horn 42 at the time of the operation of the horn switch 60 by rapidly resolving the fuse blowing state, and to reliably sound the security horn 42 when the occurrence of the theft is detected.

Further, there is a possibility that the first fuse 21 may be blown when the stop light is not turned on, and it is possible to cause a user to perceive that there is a possibility that the second fuse 22 may be blown when the small light is not turned on. For this reason, particularly, when any one of the first fuse 21 or the second fuse 22 is blown, it is possible to make the checkup time shorter than that in the case where both the first fuse 21 and the second fuse 22 are checked.

Meanwhile, in the car alarm apparatus 1 of the embodiment mentioned above, the cases in which the stop light load 35 is branched and connected between the first fuse 21 and the first relay circuit 31 and the small light load 36 is branched and connected between the second fuse 22 and the second relay circuit 32 have been described. In these connections, the small light load 36 may be branched and connected between the first fuse 21 and the first relay circuit 31, and the stop light load 35 may be branched and connected between the second fuse 22 and the second relay circuit 32. In addition, in the embodiment, the states of the first fuse 21 and the second fuse 22 can be perceived depending on the turn-on states of the stop light and the small light. A light source used in the perception of the turn-on state is not limited to the stop light and the small light, but is not particularly limited as long as it is a light source or the like capable of being turned on by a simple operation by a user.

INDUSTRIAL APPLICABILITY

According to the car alarm apparatus of the present invention, it is possible to achieve the reduction in cost and space saving, and to reliably sound an alarm at the time of a theft.

DESCRIPTION OF REFERENCE NUMERALS AND SIGNS

10: ELECTRICAL SOURCE
21: FIRST FUSE
22: SECOND FUSE
31: FIRST RELAY CIRCUIT (FIRST RELAY)
32: SECOND RELAY CIRCUIT (SECOND RELAY)
32*b*: FIRST CONTACT
32*c*: SECOND CONTACT
41: LOW-PITCHED HORN (FIRST HORN)
42: SECURITY HORN (SECOND HORN)
60: HORN SWITCH

The invention claimed is:

1. A car alarm apparatus comprising:
a first horn provided in a car;
a second horn provided in a place inaccessible from an outside of the car;
an electrical source that supplies power to the first horn and the second horn;
a theft detection section that detects an occurrence of a theft of the car;
a horn switch that receives an operation of an operator;
a first relay closed when the horn switch is operated;
a first fuse connected to the electrical source in series with the first relay and the first horn;
a second fuse connected to the electrical source separately from the first fuse; and
a second relay connected to the electrical source in series with the second fuse and the second horn,
the second relay including:
a first contact, which connects the second horn to the electrical source through the first fuse and the first relay, in parallel with the first horn, wherein said first contact is closed when electrical conduction to the first horn occurs so that both said first and second horns sound; and
a second contact that connects the second horn to the electrical source through the second fuse and that is closed when an occurrence of the theft is detected and the first fuse is blown by the theft so that said second horn sounds only.

2. The car alarm apparatus according to claim 1, wherein at least one of the first fuse and the second fuse also serves as a fuse provided between a lighting appliance mounted in the car and the electrical source.

* * * * *